US012515713B2

(12) United States Patent
Pendleton et al.

(10) Patent No.: US 12,515,713 B2
(45) Date of Patent: Jan. 6, 2026

(54) CORRIDOR/HOMOTOPY SCORING AND VALIDATION

(71) Applicant: Motional AD LLC, Boston, MA (US)

(72) Inventors: Scott Drew Pendleton, Singapore (SG); Hans Andersen, Singapore (SG); Juraj Kabzan, Boston, MA (US); Titus Chua, Singapore (SG)

(73) Assignee: Motional AD LLC, Boston, MA (US)

( * ) Notice: Subject to any disclaimer, the term of this patent is extended or adjusted under 35 U.S.C. 154(b) by 456 days.

(21) Appl. No.: 17/814,503

(22) Filed: Jul. 22, 2022

(65) Prior Publication Data

US 2024/0025452 A1 Jan. 25, 2024

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 60/0011* (2020.02); *B60W 60/0013* (2020.02); *B60W 60/0015* (2020.02)

(58) Field of Classification Search
CPC ............ B60W 60/0027; B60W 40/04; B60W 60/0011; B60W 60/0013; B60W 60/0015; B60W 2552/10; B60W 2556/40; B60W 2556/50; B60W 30/18163; B60W 60/00276; G01C 21/20
See application file for complete search history.

(56) References Cited

U.S. PATENT DOCUMENTS

| 8,380,425 | B2 * | 2/2013 | Duggan | G08G 5/0069 |
| | | | | 340/963 |
| 8,494,693 | B2 * | 7/2013 | Murphy | G01C 23/00 |
| | | | | 701/16 |
| 9,868,443 | B2 | 1/2018 | Zeng et al. | |
| 10,214,234 | B2 * | 2/2019 | Kim | B62D 5/0466 |

(Continued)

FOREIGN PATENT DOCUMENTS

CN 114034301 A 2/2022

OTHER PUBLICATIONS

International Search Report and Written Opinion received for PCT Application No. PCT/US2023/070717, mailed Nov. 7, 2023.

(Continued)

*Primary Examiner* — Redhwan K Mawari
(74) *Attorney, Agent, or Firm* — Knobbe, Martens, Olson & Bear, LLP

(57) ABSTRACT

Provided are methods and systems for corridor/homotopy scoring and validation. A method for operating an autonomous vehicle, is provided. The method includes obtaining sensor data associated with an environment in which an autonomous vehicle is operating and determining, by the at least one processor, a set of agents in the environment based on the sensor data. The method includes determining, by the at least one processor, a plurality of sets of navigation options for the autonomous vehicle, wherein each set of navigation options includes a first navigation option and a second navigation option, and wherein at least one set of navigation options is associated with at least one agent of the (Continued)

set of agents. The method includes selecting a plurality of navigation options from the plurality of sets of navigation options and generating a corridor for the autonomous vehicle based on the plurality of selected navigation options.

19 Claims, 12 Drawing Sheets

(56) References Cited

U.S. PATENT DOCUMENTS

| | | | | |
|---|---|---|---|---|
| 10,384,715 | B2* | 8/2019 | Schneider | B60W 60/0053 |
| 10,457,314 | B2* | 10/2019 | Swamidason | B62D 5/005 |
| 10,556,614 | B2* | 2/2020 | Swamidason | B62D 1/181 |
| 10,860,019 | B2* | 12/2020 | Censi | G05D 1/0257 |
| 10,913,491 | B2* | 2/2021 | Lesbirel | B60W 20/00 |
| 10,946,894 | B2* | 3/2021 | Pramod | B62D 5/0487 |
| 10,960,886 | B2* | 3/2021 | Pendleton | B60W 40/04 |
| 11,014,606 | B2* | 5/2021 | Wu | B62D 5/0475 |
| 11,325,592 | B2* | 5/2022 | Wongpiromsarn | B60W 60/0015 |
| 12,054,204 | B2* | 8/2024 | Ramanujam | B62D 5/0481 |
| 2009/0254275 | A1* | 10/2009 | Xie | G01C 21/005 |
| | | | | 701/469 |
| 2010/0228468 | A1* | 9/2010 | D'Angelo | G08G 5/25 |
| | | | | 701/120 |
| 2011/0251800 | A1* | 10/2011 | Wilkins | G01S 19/49 |
| | | | | 702/24 |
| 2012/0237028 | A1* | 9/2012 | Khazan | G05D 1/0022 |
| | | | | 380/258 |
| 2013/0012231 | A1* | 1/2013 | Hall | H04W 4/38 |
| | | | | 455/456.2 |
| 2014/0018979 | A1* | 1/2014 | Goossen | G08G 5/0034 |
| | | | | 701/3 |
| 2014/0249693 | A1* | 9/2014 | Stark | G05D 1/0808 |
| | | | | 701/2 |
| 2014/0274151 | A1* | 9/2014 | Pattabiraman | H04B 7/12 |
| | | | | 455/456.3 |
| 2015/0254988 | A1* | 9/2015 | Wang | G08G 5/0013 |
| | | | | 701/3 |
| 2015/0260850 | A1* | 9/2015 | Deng | G01S 19/17 |
| | | | | 342/357.25 |
| 2016/0030808 | A1* | 2/2016 | Uchida | G09B 19/0038 |
| | | | | 482/8 |
| 2016/0189548 | A1* | 6/2016 | Thurling | G08G 5/0069 |
| | | | | 701/3 |
| 2016/0290826 | A1* | 10/2016 | Brenner | G01C 23/005 |
| 2016/0291589 | A1* | 10/2016 | Ashoori | G05D 1/106 |
| 2017/0158227 | A1* | 6/2017 | Katzourakis | B62D 6/008 |
| 2018/0144641 | A1* | 5/2018 | Wang | G08G 5/0052 |
| 2019/0299983 | A1* | 10/2019 | Shalev-Shwartz | B62D 15/0265 |
| 2020/0017139 | A1* | 1/2020 | Ramanujam | B62D 5/0481 |
| 2020/0189575 | A1* | 6/2020 | Wongpiromsarn | G08G 1/166 |
| 2020/0238996 | A1* | 7/2020 | Pendleton | B60W 40/04 |
| 2020/0239067 | A1* | 7/2020 | Wu | B62D 5/0463 |
| 2021/0101599 | A1* | 4/2021 | Pendleton | B60W 30/18159 |
| 2021/0107566 | A1* | 4/2021 | Seegmiller | H04W 4/02 |
| 2021/0166325 | A1* | 6/2021 | Shalev-Shwartz | G06Q 10/00 |
| 2021/0255635 | A1* | 8/2021 | Vora | G06N 3/08 |
| 2021/0276588 | A1* | 9/2021 | Kabzan | B60W 10/04 |
| 2024/0046363 | A1* | 2/2024 | Shalev-Shwartz | B62D 15/0265 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

International Preliminary Report received for PCT Application No. PCT/US2023/070717, mailed Feb. 6, 2025.

* cited by examiner

CORRIDOR/HOMOTOPY SCORING AND VALIDATION

BACKGROUND

Autonomous vehicles can use a number of methods and systems for determining a trajectory for the autonomous vehicle. However, these methods and systems can require high computational power, which can lead to inefficient computation. Further, the methods and systems can slow the reaction time of the autonomous vehicle, which can lead to real-world complications.

DETAILED DESCRIPTION

Figure 1:
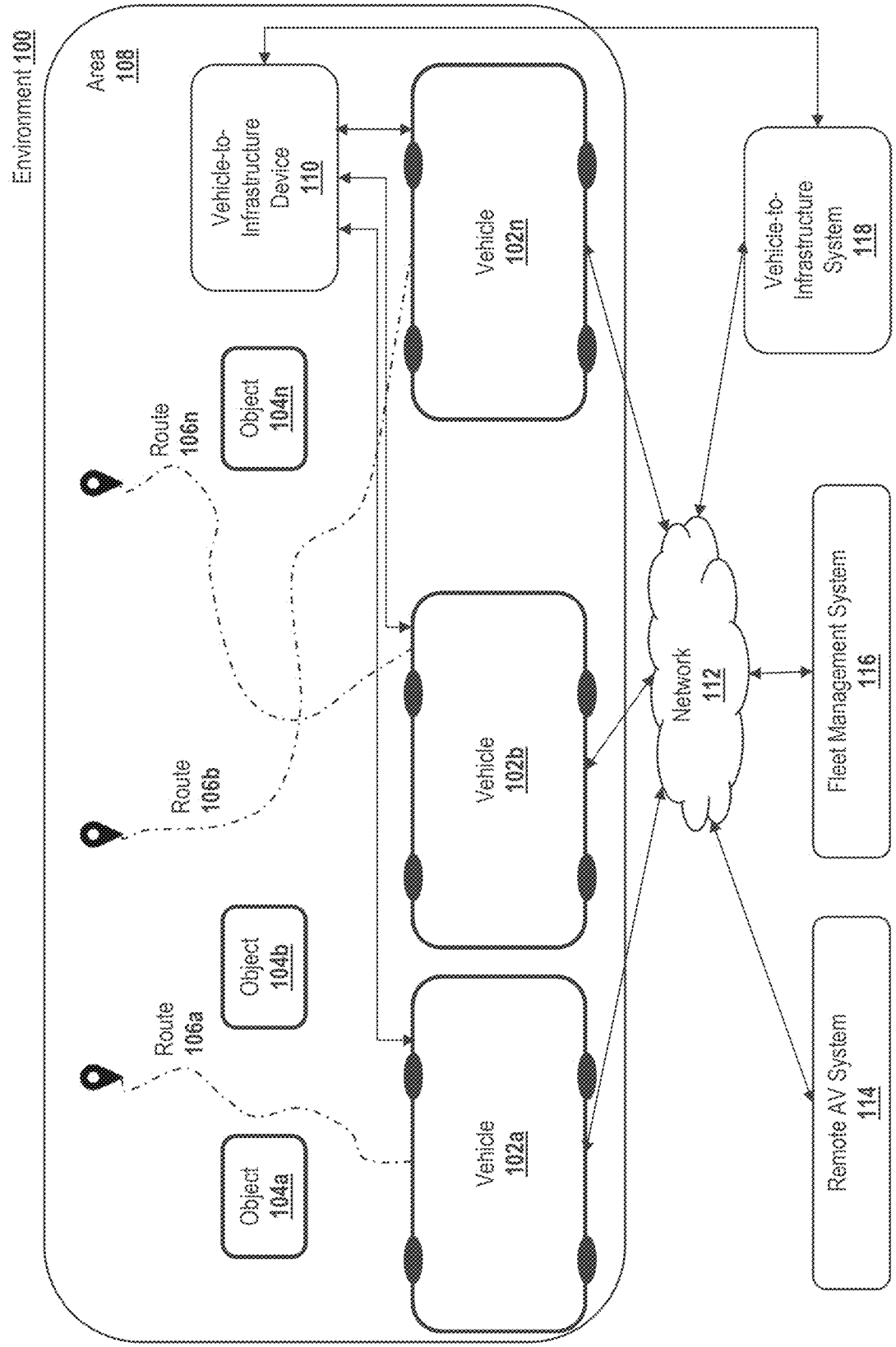
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement corridor/homotopy scoring and validation. In vehicle path planning, there can be many potential corridors through which a vehicle can travel through a scene. Analyzing all paths within all potential corridors is in some cases not possible or efficient given the computational resources and time constraints of a vehicle. These issues can be addressed by a system that validates, scores, and prioritizes corridors. In some cases, the system can validate or reject corridors based on spatial constraints (e.g., corridor includes going offroad or there is insufficient space for the vehicle) and/or temporal constraints (e.g., vehicle acceleration capacity is finite). To validate, score, and prioritize corridors, the system can generate various homotopy/navigation options with regard to objects encountered within a time window. For example, the system can simulate the scene based on the vehicle going before or after different objects in the scene. Depending on the vehicle's reaction to one object, the system can simulate options with respect to the next object that is simulated to interact with the vehicle. Using the navigation options, the system can generate a potential corridor through which the vehicle can travel. The system can continue to generate corridors based on additional navigation options, and score corridors based on comfort, safety, or other criteria, and select a corridor based on the scores. In some cases, the system can analyze various paths within the selected corridor to identify a path for the vehicle and then control the vehicle based on the selected path.

Each homotopy/navigation option can be evaluated based on corridor validation criteria. The corridor validation criteria can include temporal (e.g., acceleration or deceleration limitations of the autonomous vehicle) and/or spatial criteria (e.g., taking the autonomous vehicle off the road or insufficient space for the vehicle in a particular location) For example, the corridor validation criteria can include whether a homotopy/navigation option is physically possible given spatio-temporal parameters and capabilities of the vehicle.

By virtue of the implementation of systems, methods, and computer program products described herein, techniques for corridor/homotopy scoring and validation provide more efficient path planning and reduced compute resources to determine a path.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 can include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
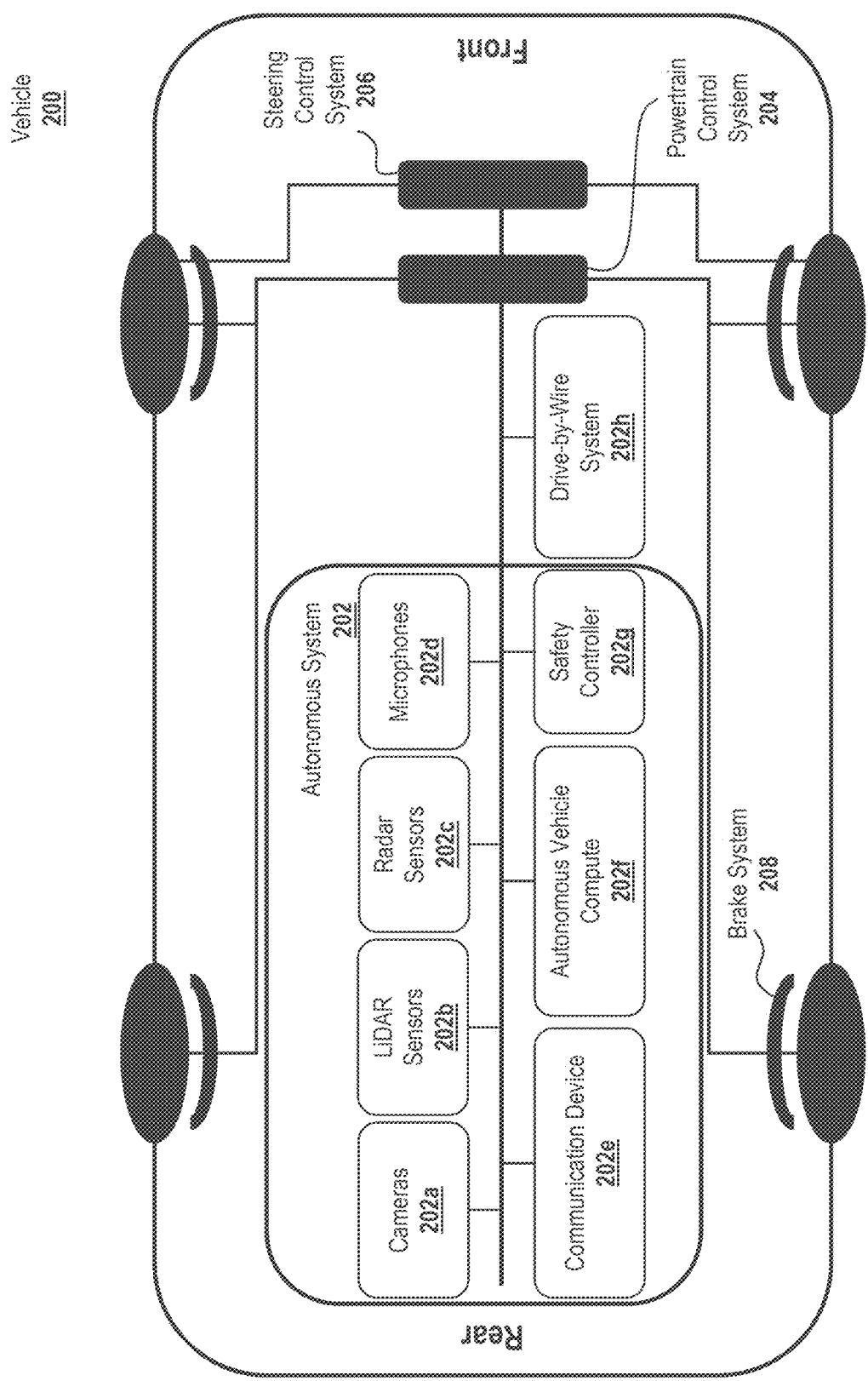
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
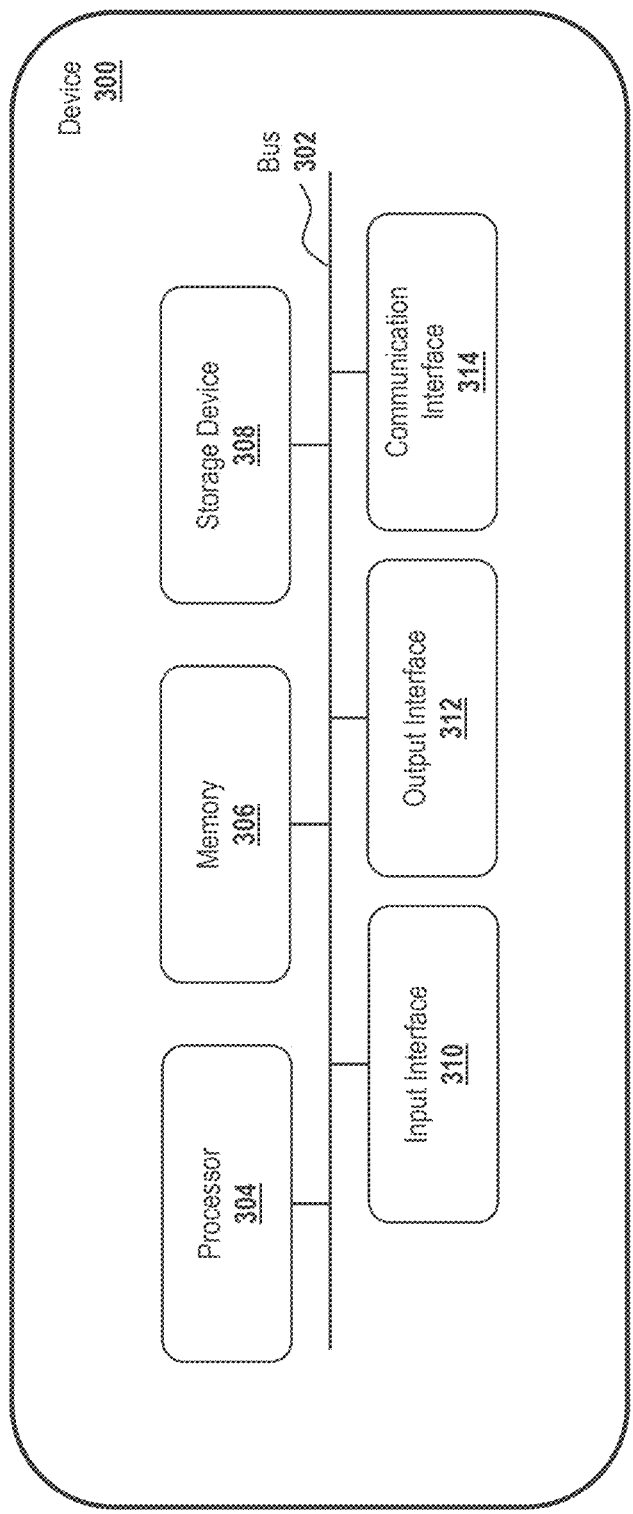
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), vehicle 200, and/or one or more devices of network 112 (e.g., one or more devices of a system of network 112). In some embodiments, one or more devices of vehicles 102 (e.g., one or more devices of a system of vehicles 102), vehicle 200, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, the processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system 402.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
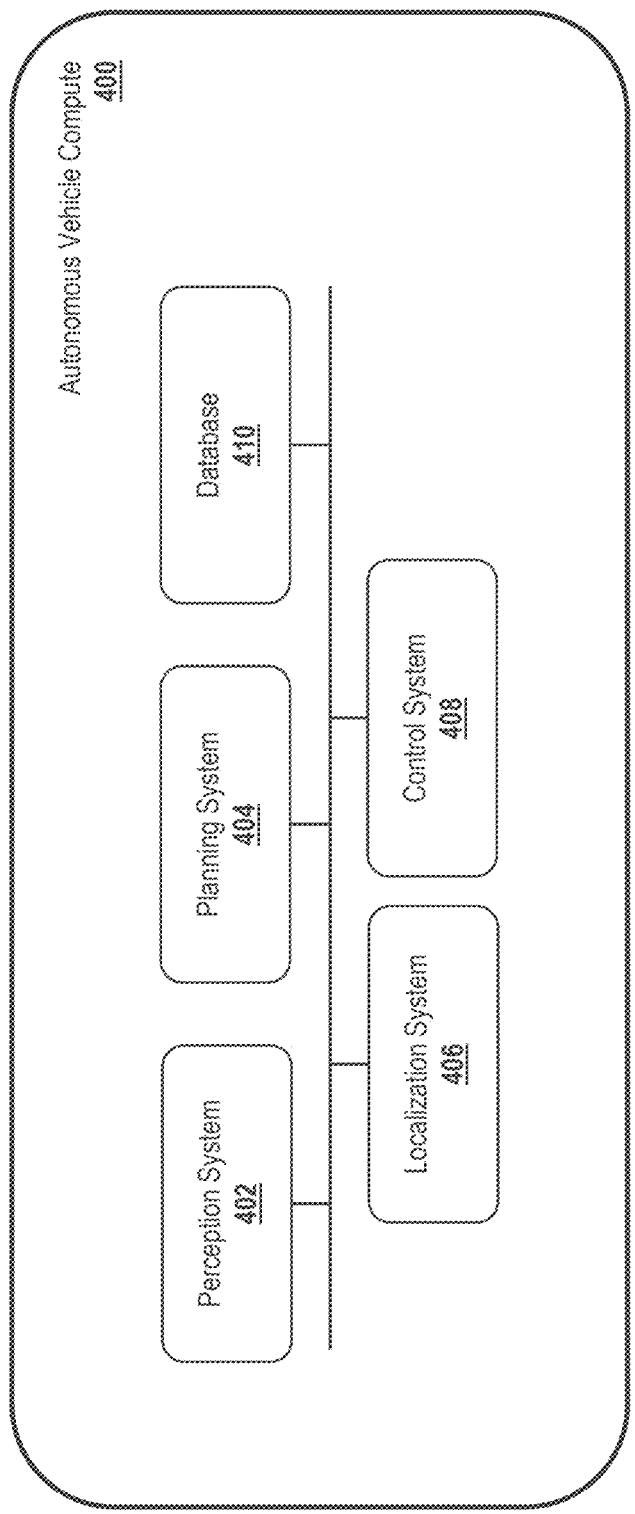
FIG. 4A is a diagram of certain components of an autonomous system.
Figure 4B:
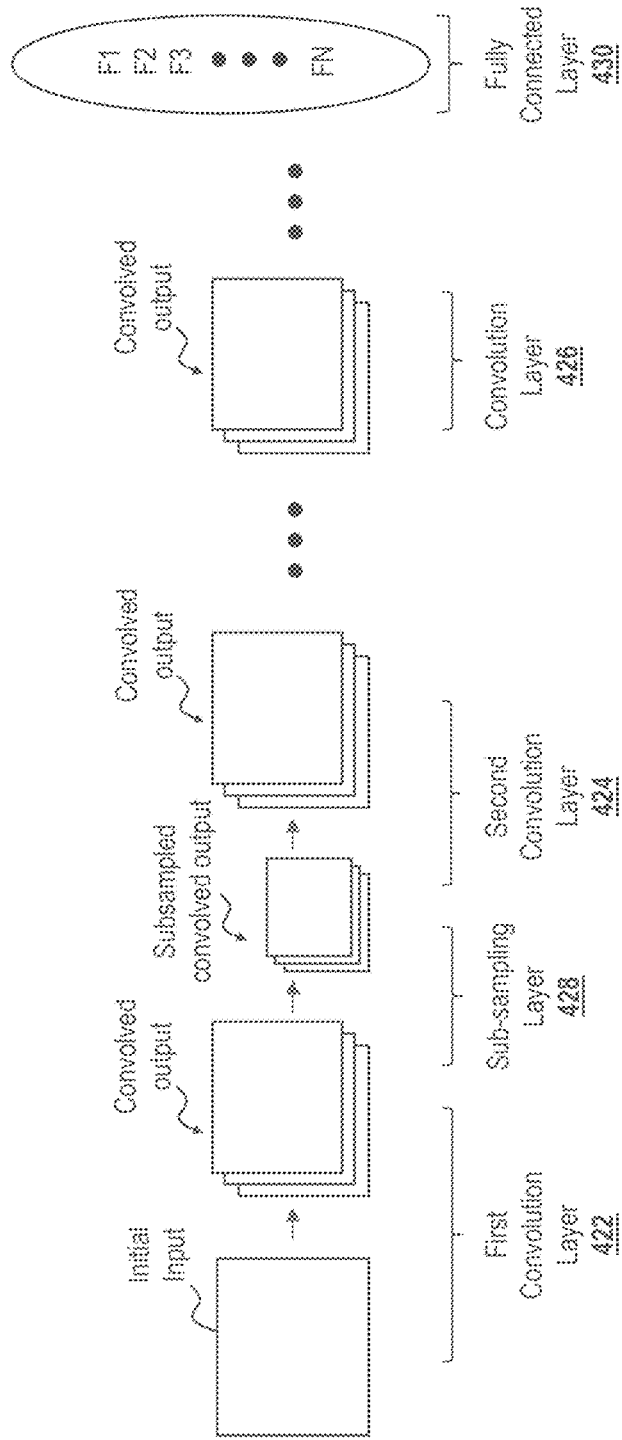
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN.

In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
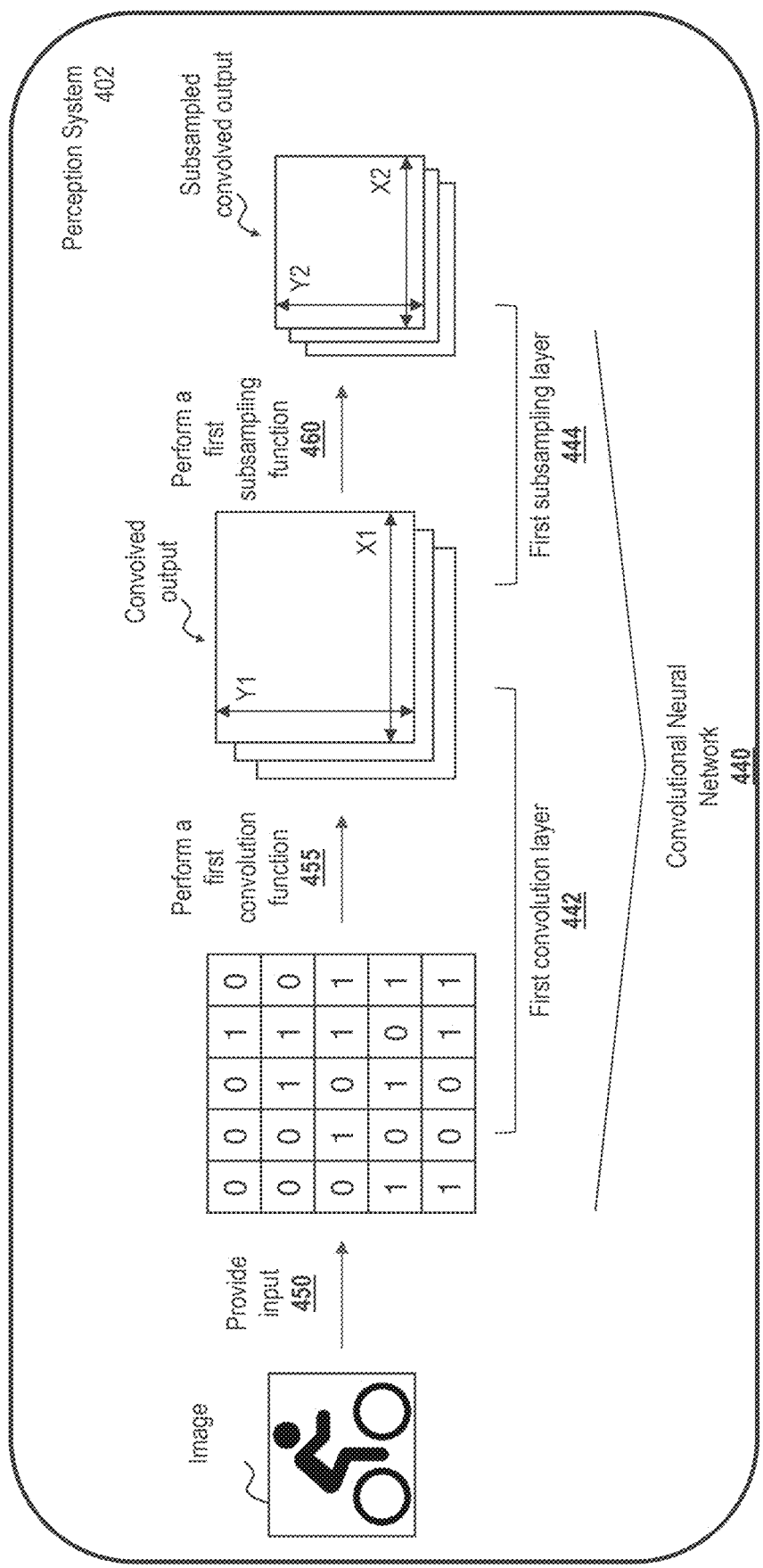
FIGS. 4C and 4D are a diagram illustrating example operation of a CNN.
Figure 4D:
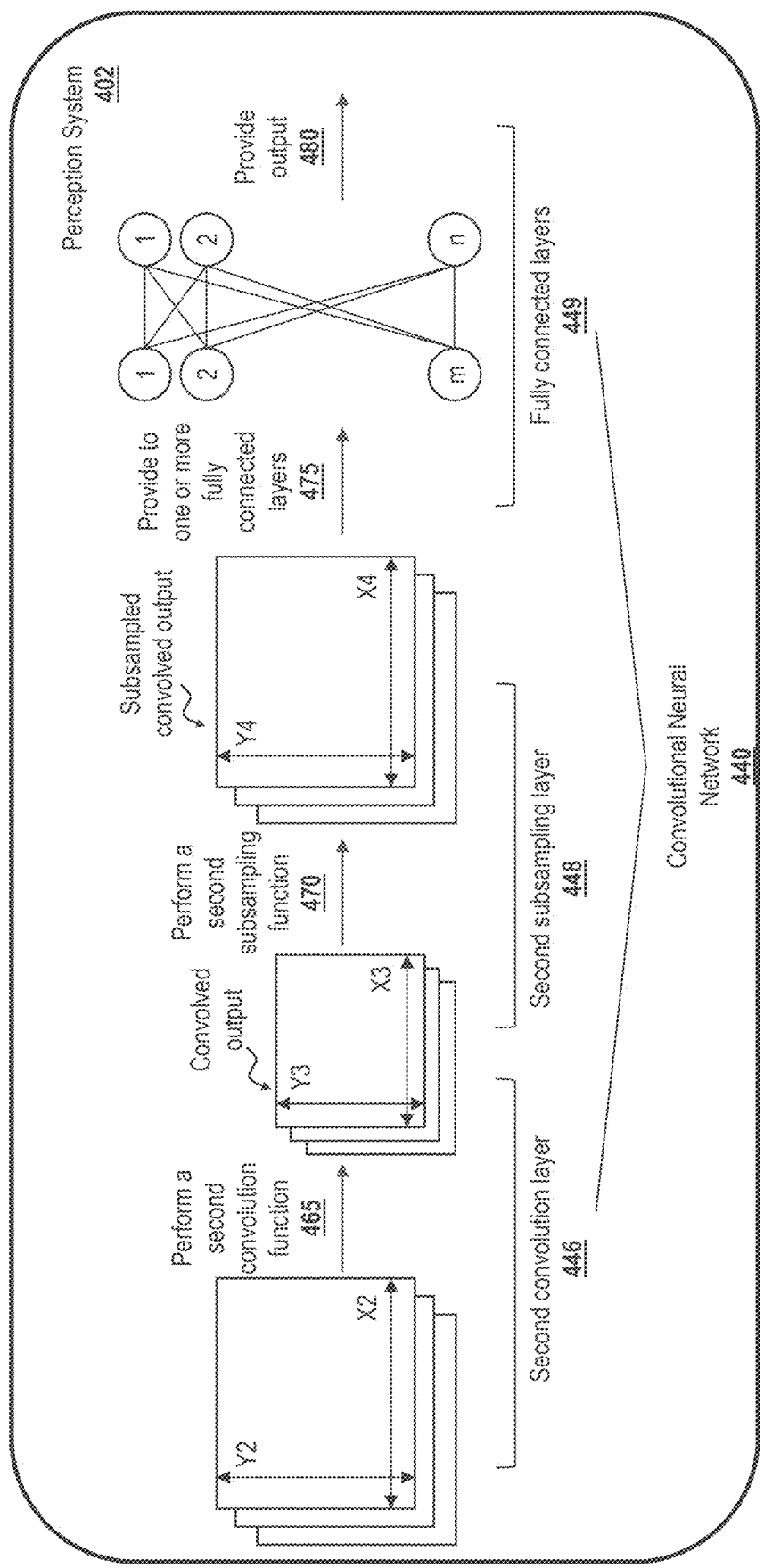

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Path Planning Using Corridors

Path planning for an autonomous vehicle is an operation that can use significant computational resources from an autonomous vehicle 200. Excessive path planning processes can adversely affect the performance of an autonomous vehicle. For example, the autonomous vehicle planning system 404 can analyze several possible paths when determining a path to execute for the vehicle 200. However, analyzing the possible paths for the vehicle can consume significant computational resources, such as RAM, processor bandwidth and time, etc., causing the vehicle 200 to allocate comparatively limited resources for other processes. The high computational resource consumption for analyzing a number of potential paths can also slow processing time for determining a path for the vehicle and/or the vehicle 200 may not have sufficient time to analyze the potential paths within the given time constraints to operate the vehicle effectively.

Moreover, some paths generated by a planning system 404 can include general areas that cannot or should not be traveled by a vehicle 200. For example, an area can include a lane or a roadway that is blocked, inaccessible, or unsafe to navigate. As another example, certain areas of the environment can include an off-road environment or space between an agent and a boundary (e.g., edge of the road) that is not large enough to accommodate the vehicle, and can therefore not be safe, physically possible, or feasible. As another example, an area of the environment may not be reached in a particular amount of time given physical constraints of the vehicle (e.g., acceleration capabilities). As such, determining detailed paths that lead to or fit into an area that is blocked or inaccessible, or an unsafe lane or roadway, can be inefficient or a waste of compute resources.

Determining detailed paths for a vehicle can be computationally intensive, whereas eliminating general areas (or even corridors) from consideration prior to determining a path for the vehicle can be significantly less computationally intensive. Accordingly, the planning system 404 can save computational resources by generating corridors where the autonomous vehicle can or should travel (and identifying or ruling out areas or corridors where the autonomous vehicle cannot or should not travel), and then generating paths within some or all of the corridors. In certain cases, the corridors can be generated based on temporal or spatial constraints of the environment.

In some cases, the planning system 404 can rank and prioritize the corridors and determine paths for the vehicle within some or all of the corridors. In certain cases, the planning system 404 determines that there are no valid corridors for a particular environment. In some such cases, the planning system 404 can take appropriate measures to maintain the safety and/or security of passengers of the vehicle 200.

In certain cases, the planning system determines paths for a subset of the generated corridors based on their ranking and/or the computational resources of the planning system 404. The paths for a particular corridor or set of corridors can be ranked and selected according to predetermined parameters such as safety, comfort, or efficiency. The selected path can be used to control the vehicle 200.

In some examples, the planning system 404 can identify or generate available corridors using navigation options (including but not limited to: homotopy options, binary options, non-binary options, etc.). The planning system 404 can identify the navigation options based on objects in the vehicle's 200 environment that are detected by the perception system 402. For example, the perception system 402 can identify objects in the vehicle's 200 environment. The planning system 404 can, in turn, determine how to interact with one or more of the identified objects. For example, the planning system 404 can determine that for each object, the vehicle is to go left or right or go in front of or behind the object, etc. In certain cases, the go left/go right or go in front of/behind can be the navigation options used by the planning system to generate a corridor.

As the vehicle 200 simulates the environment, the planning system 404 can make successive decisions about navigating around the objects according to the navigation options. The planning system can combine a group of successive navigation options to form a corridor.

In grouping navigation options to form a corridor, the planning system 404 can use corridor validation criteria. The corridor navigation criteria can be used to eliminate navigation options with less desirable outcomes (e.g., options that are not physically possible, actions that would break certain rules like violating minimum clearance requirements between the vehicle 200 and with a pedestrian or leaving a driving surface, actions or states that do not satisfy comfort or safety thresholds, etc.). For example, if the planning system 404 determines that a navigation option would result in a collision, the planning system 404 would eliminate the corridor associated with that navigation option from consideration. Accordingly, the planning system 404 can utilize the corridor validation criteria to iteratively select navigation options and construct corridors through the environment of the vehicle 200.

In some cases, the corridors can be determined based on successive selection of the navigation options. The navigation options can provide simplified determinations with respect to agents in an environment and provide a framework for an estimated path. By selecting and using navigation options that satisfy corridor validation criteria, the planning system 404 can eliminate corridors or areas in the environment of the vehicle 200 that can cause collisions with agents or cause other unsafe or undesirable results. This use of navigation options and elimination of unsafe or undesirable corridors to effectively reduce the area of the environment or number of corridors for which paths are to be generated can reduce computational costs compared to traditional techniques for path planning.

In some cases, the planning system 404 can group navigation options associated with a particular decision for an object as a navigation option set. For example, the decision to go before or after a particular agent can be associated (or related) as a navigation option set. Navigation options in a navigation option set can branch into other navigation option sets to form a navigation option tree, an example of which is shown and described herein at least with reference to FIG. 5.

In some examples, the planning system 404 recursively analyzes navigation options up to an endpoint and groups the analyzed navigation options as a corridor. The endpoint can correspond to a stopping point, where the planning system 404 does not continue to analyze subsequent navigation options in a branch. In some examples, the endpoint can correspond to an estimated travel time, an estimated distance traveled, etc. In certain cases, the planning system 404 can traverse the navigation option tree to generate multiple corridors. As described herein, the corridors can include overlapping navigation options.

As described herein, navigation options available for selection can be based on preceding navigation option choices. For example, a first navigation option set can include a first navigation option and a second navigation option. The first navigation option can lead to a subsequent second navigation option set that has first and second navigation options. Similarly, the second navigation option of the first navigation option set can lead to a subsequent third navigation option set that has first and second navigation options that are different from the second navigation option set. Choosing the first navigation option can enable the planning system 404 to simulate the environment and access the subsequent second navigation option set, which includes its own first and second navigation options. Choosing the second navigation option (of the first navigation option set) can enable the planning system 404 to simulate the environment in a different way and to access the subsequent third navigation option set, which includes its own first and second navigation options. If the first navigation option is chosen for a corridor, then in some cases the third navigation option set can be unavailable for the autonomous system to assign to that corridor. As such, navigation option sets can be linked to previous navigation options to efficiently construct a corridor.

As a non-limiting example consider a scenario in which an obstacle can obstruct the vehicle's 200 path in a roadway. In some such cases, the vehicle 200 can have one navigation option of a navigation option set to move to the left of the obstacle and a second navigation option of the navigation option set to move to the right of the obstacle. The choice of whether to navigate to the left or to the right can constrain possible navigation options for the vehicle 200 after the choice has been made. For example, if an on-ramp exists that exits to the left, the vehicle 200 can only have access to this on-ramp in a successive navigation option if the vehicle 200 moves to the left instead of to the right. As such, the decision to enter the on ramp will only be available if the vehicle 200 selects the move to the left navigation option. As another example, other vehicles in the left lane or right lane can limit the vehicle's 200 options.

In some cases, as the planning system 404 generates potential corridors, it can filter out certain navigation options (e.g., options that are not physically accessible or options that are unsafe) based on the corridor validation criteria. By filtering out certain navigation options, the planning system 404 can reduce the number of corridors that will be used to analyze potential paths, and can therefore reduce the number of vehicle paths that are generated and analyzed. For example, if the planning system 404 determines that a certain navigation option does not satisfy certain corridor validation criteria, the processor planning system 404 can rule out the subsequent navigation options that branch from that navigation option that does not satisfy the criteria. With reference to the example above, if the autonomous vehicle 200 moves to the left lane, the planning system 404 can discount navigation options to enter an access road that is only accessible from the right lane. In another example, if it is not possible for the autonomous system to navigate in front of an obstacle due to an obstruction, the planning system 404 can rule out other options that would become available if the vehicle 200 would have navigated in front of the obstacle. As such, the planning system 404 considers options available if the vehicle 200 navigates before the obstacle. The elimination of navigation options and navigation option sets that branch from the eliminated navigation options can have the benefit of eliminating an area of the environment from consideration for potential paths, the generation of corridors that can include the eliminated area, and the generation of paths within the eliminated corridors, thereby reducing the amount of computational resources used to generate a path for the vehicle.

In some examples, no navigation option in a given navigation option set can satisfy corridor validation criteria. For example, a navigation option set can include two navigation options that would each cause a collision with an obstacle. In such cases, the planning system 404 can eliminate both navigation options from consideration as part of a corridor, and can select an alternative navigation option from an earlier navigation option set. The alternative navigation option set is separate from the navigation option set from which neither navigation option was selected. As such, the alternative navigation option can lead to a navigation option that satisfies corridor validation criteria (and can therefore be used to generate a corridor).

Further, in some examples the planning system 404 can determine the alternative navigation option does not satisfy corridor validation criteria. In cases where the alternative navigation option does not satisfy corridor validation criteria, the planning system 404 can choose earlier navigation options until a navigation option is identified that satisfies the corridor validation criteria (if any). For example, one navigation option can lead to a navigation option set where neither navigation option satisfies corridor validation criteria. The planning system 404 can revert to a previous alternative navigation option set instead. The previous alternative navigation option set can yield two navigation options that also do not satisfy corridor validation criteria. The planning system 404 can then revert to a second previous alternative navigation option set that contains at least one navigation option that does satisfy corridor validation criteria. The planning system 404 can then determines a navigation option based on the second previous navigation option set.

Figure 5:
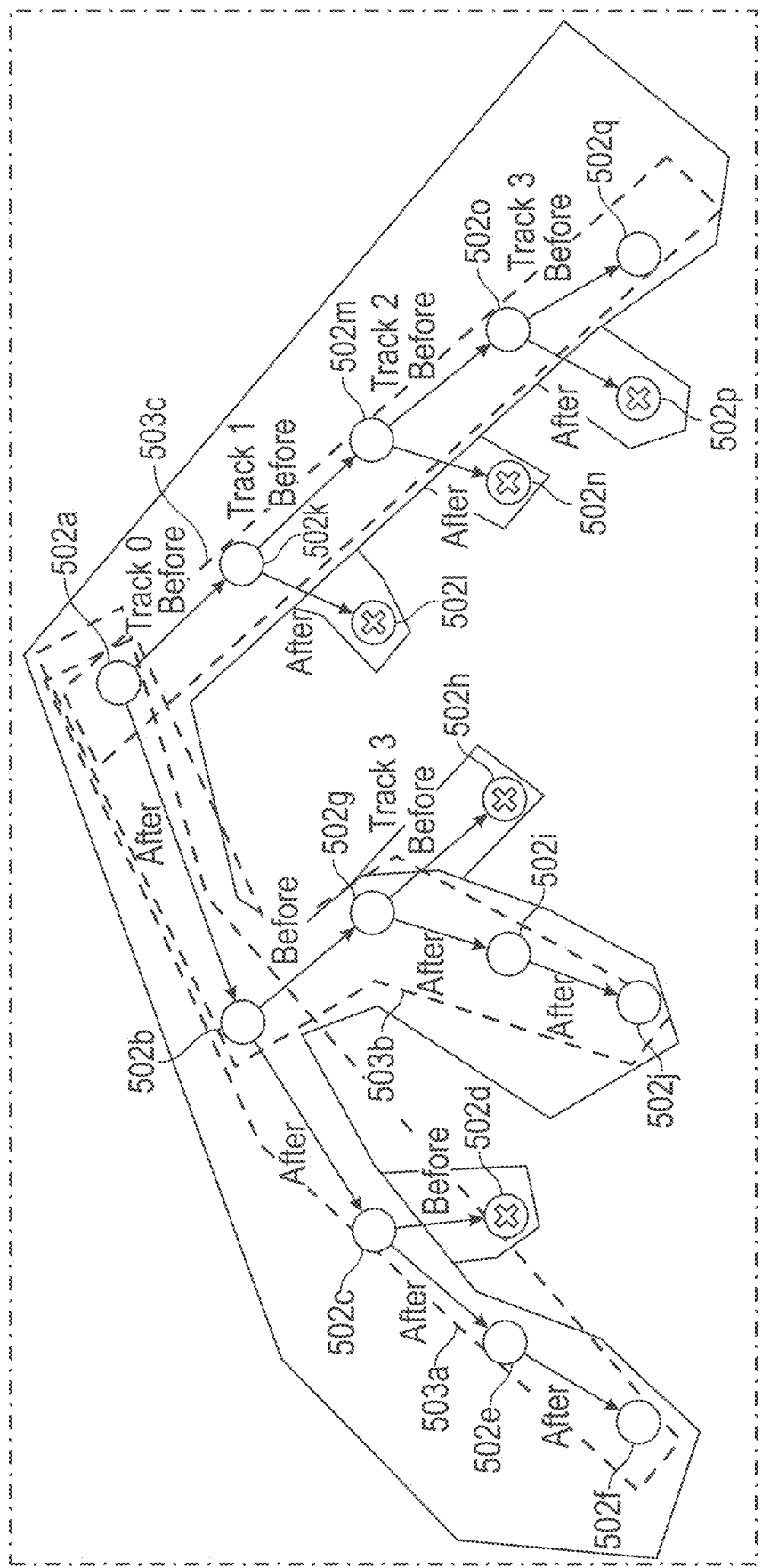
FIG. 5 is a diagram of an implementation of a process for homotopy/navigation option selection.

FIG. 5 is a diagram illustrating an example of a navigation option tree for determining corridors that satisfy certain corridor validation criteria. As described herein, navigation options can be based on descriptions of the vehicle 200 relative to agents in the vehicle's 200 environment. For example, FIG. 5 illustrates a group of navigation options that include word-descriptions such as "before" and "after," which indicate the relationship of the vehicle 200 to at least one obstacle/agent in an environment. However, in some examples, the word descriptions can indicate any navigational decision that the vehicle 200 can make, such as left/right, etc. Moreover, the navigation option tree can illustrate spatial or temporal navigation options.

FIG. 5 shows nodes 502a-502q (individually or collectively referred to as node(s) 502). Each node 502 can represent a navigation option at a particular time and/or location for the vehicle 200. As such, the navigation option tree can illustrate the choices for an autonomous vehicle relative to different objects or tracks at different times and/or locations within an environment. Although in the example shown in FIG. 5 the navigation options are word-descriptions such as "before" and "after," in other examples navigation options can include "left," "right," "front," "rear," or any other identifier that defines a relationship between the vehicle 200 and an obstacle/agent.

Certain navigation options can be grouped into navigation option sets. Moreover, some or all navigation option sets can have a parent navigation option (e.g., the navigation option from which the navigation options of the navigation option set branch).

In the illustrated example, a navigation option set includes one or two navigation options, however it will be understood that any number of navigation options can be included in a navigation option set. As described herein, each navigation option set can represent the outcomes of different actions taken by the vehicle as a result of a navigational decision as the vehicle 200 moves through an environment. In the illustrated example of FIG. 5, the navigation option sets include an action of "before" or "after" indicating whether the vehicle is to go before or after an object, however, it will be understood that other actions and/or non-binary choices can be used for the navigation option sets.

In some examples, navigation options of the navigation option sets can be chosen based on predetermined factors such as physical availability of the navigation options. For example, the planning system 404 can choose navigation options that are not physically obstructed from the vehicle 200 during a time window. The planning system 404 can use various logical processes to structure evaluation of the navigation options. For example, the planning system 404 can evaluate navigation sets in direct succession, which have similar proximity to a parent navigation option set. For example, the planning system 404 can evaluate 502b and 502k in direct succession, as 502b and 502k each branch directly from 502a. In some examples, the planning system 404 can evaluate the navigation options in succession through the end of a logical branch. For example, the planning system 404 can evaluate the navigation options 502a, 502b, 502c, 502e, and 502f in direct succession and subsequently evaluate other branches. However, it will be understood that other structures and logical processes can be used to evaluate and choose the navigation options and navigation option sets.

The system can use two or more successively chosen navigation options to build a pathway/corridor for the autonomous system to follow. In the example shown in FIG. 5, the various navigation options form a plurality of potential corridors for the vehicle 200 based on the "before" and "after" relationships between the vehicle 200 and one or more objects (or tracks) in a vehicle scene.

In the illustrated example of FIG. 5, the planning system 404 has identified three corridors that include navigation options that satisfy corridor validation criteria. A first corridor 503a includes nodes 502a, 502b, 502c, 502e, and 502f; a second corridor 503b includes nodes 502a, 502b, 502g, 502i, and 502j; and a third corridor 503c includes nodes 502a, 502k, 502m, 502o, and 502q.

To create the different corridors, the planning system 404 can evaluate and link together the various navigation options or nodes 502 that satisfy corridor validation criteria (e.g., satisfactory options). For example, at node 502a the planning system 404 determines that there are two satisfactory options for the vehicle at a particular time: moving before or after an object. At node 502b, the planning system 404 determines that there are two satisfactory options for the vehicle at a different time: moving before or after a different object. At node 502c the planning system 404 determines that there is one satisfactory option: moving after an object. Node 502d is not branched, as the corresponding navigation option does not satisfy the corridor validation criteria. At node 502e the planning system 404 determines that there is one satisfactory option: moving after an object. At node 502f, the planning system 404 identifies an endpoint at which the planning system 404 stops branching navigation options. At node 502g the planning system 404 determines that there is one satisfactory option: moving after an object. Node 502h is not branched (or further analyzed), as it is not a satisfactory option. At node 502i, the planning system 404 determines that there is one satisfactory option: moving after an object. At node 502j, the processor has reached a stop point at which, the processor will stop determining navigation options. At node 502k, the planning system 404 determines that there is one satisfactory option: moving before an object. Node 502l is not branched, as it is not a satisfactory option. At node 502m, the planning system 404 determines that there is one satisfactory option moving before an object. Node 502n is not branched, as it is not a satisfactory option. At node 502o, the planning system 404 determines that there is one satisfactory option: moving before an object. Node 502d is not branched, as it is not a satisfactory option. At node 502c, the planning system 404 determines that there is one satisfactory option: moving after an object. Node 502p is not branched, as it is not a satisfactory option. At node 502q, the processor is at an endpoint at which, the processor will stop determining navigation options.

The planning system 404 can evaluate the various navigation options and group them into corridors. In certain cases, the planning system 404 can use one or more corridor creation criteria to determine whether a group of navigation options can be considered a corridor. The corridor creation criteria can use any one or any combination of threshold number of navigation options, threshold distance, and/or threshold time to determine whether a group of navigation options are to be used to create a corridor. For example, in some cases, the planning system 404 can determine that to be a corridor, the group of navigation options are to include a threshold number of navigation options (e.g., it takes five successive navigation options to form a corridor) or the group of navigation options are to cover an estimated distance (e.g., the total distance traveled for the navigation options is to be at least 200 yards) or an estimated time (e.g., the total time of the navigation options is to last six seconds).

In some cases, the planning system 404 can continue selecting navigation options for a corridor until an end state is reached. In some cases, an end state policy can be used to determine when the end state is reached. The end state policy can take into account any one or any combination of threshold simulated time period, threshold number of navigation options, threshold simulated distance, or landmark reached or passed to determine when the end state will occur. For example, the end state policy can indicate that the planning system 404 is to select navigation options until six seconds of travel time (or some other threshold time period) has been simulated. As another example, the end state policy can indicate that the planning system 404 is to select navigation options for the vehicle 200 until five navigation options (or some other threshold number of navigation options) have been grouped to form a corridor. In certain cases, the end state policy can indicate that the scene evaluation system 504 is to select successive navigation options for a corridor until a threshold distance has been reached or a landmark reached. For example, the planning system 404 can select navigation options for the vehicle 200 and objects in the vehicle scene until ¼ mile (or other threshold distance) has been simulated or until an intersection (or another landmark) has been passed. As such, the end state can be reached even though additional navigation options could be selected (e.g., the simulations could continue). For example, the end state in some examples can represent something other than the end of a route or the termination of driving, rather the end state can represent a point (in time, location, distance, etc.) at which any generated paths are to end.

Once the end state is reached, the simulated trajectory corridor can be evaluated based on a corridor evaluation policy. The corridor evaluation policy can indicate the criteria by which the corridor is to be evaluated. For example, the corridor evaluation policy can indicate that corridors are to be evaluated based on factors such as shortest distance, safety, comfort, or any other factor that can inform a vehicle navigation decision.

In the illustrated example, the planning system 404, identifies three corridors 503*a*, 503*b*, and 503*c* (and/or determines that the three corridors 503*a*, 503*b*, and 503*c* are satisfactory corridors). In some cases, the planning system 404 can rank the three corridors (503*a-c*) based on any desired number of factors, such as but not limited to shortest distance, safety, comfort, or any other factor that can inform a vehicle navigation decision. For example, the planning system 404 can determine that following a certain corridor, would cause the vehicle 200 to follow a longer path than following a different corridor that would cause the vehicle 200 to follow a shorter/more direct path. Based on shortest distance, the planning system 404 can rank the corridor having a shorter/more direct path higher than the corridor having the longer path. In another example, the planning system 404 can evaluate a proximity of the corridor relative to agents. Based on safety, the planning system 404 can rank a corridor that is further from at least one of the agents higher than a corridor that is closer to at least one of agents. In some examples, the planning system 404 can determine that following a certain corridor would cause abrupt acceleration and deceleration of the vehicle 200 when compared to other corridors. Based on comfort, the planning system 404 can rank the corridor causing the abrupt acceleration and deceleration lower than the corridors that cause less abrupt acceleration and deceleration. Based on the rankings, the planning system 404 can select a subset of corridors for path generation. In some cases, the planning system 404 can have a predetermined number of corridors to evaluate and further analyze the highest ranked corridors up to the set number of corridors.

In some cases, the planning system 404 can evaluate the corridors based on one or more criteria and eliminate a corridor from consideration for path generations if the corridor does not satisfy the criteria. For example, the planning system 404 can determine to evaluate both the corridor between 502*a* and 502*f* and the corridor between 502*a* and 502*j* based on safety risk. The planning system 404 can then determine to dismiss the corridor between 502*a* and 502*q* because it does not satisfy the safety threshold. As such the planning system 404 can only expend compute resources to determine detailed paths between 502*a* and 502*f* and between 502*a* and 502*j*.

As described herein, the planning system 404 analyzes the different corridors to identify available paths within each corridor. Moreover, the planning system 404 can evaluate and rank the available paths. Further, the planning system 404 determines which path to choose based at least in part on one or more factors or a trained neural network. Examples of factors that can be considered when determining a preferred vehicle path, can include distance, time, safety risk, route accessibility, comfort, and number of alternative corridors available. The planning system 404 can evaluate the factors to determine which paths to commit additional computational resources to. The planning system 404 can determine a lower threshold limit for each of the factors and dismiss path options that do not rise above this lower limit. In other examples, the planning system 404 can have a predetermined number of paths to evaluate and further analyze the highest ranked paths up to that set number of paths.

Figure 6:
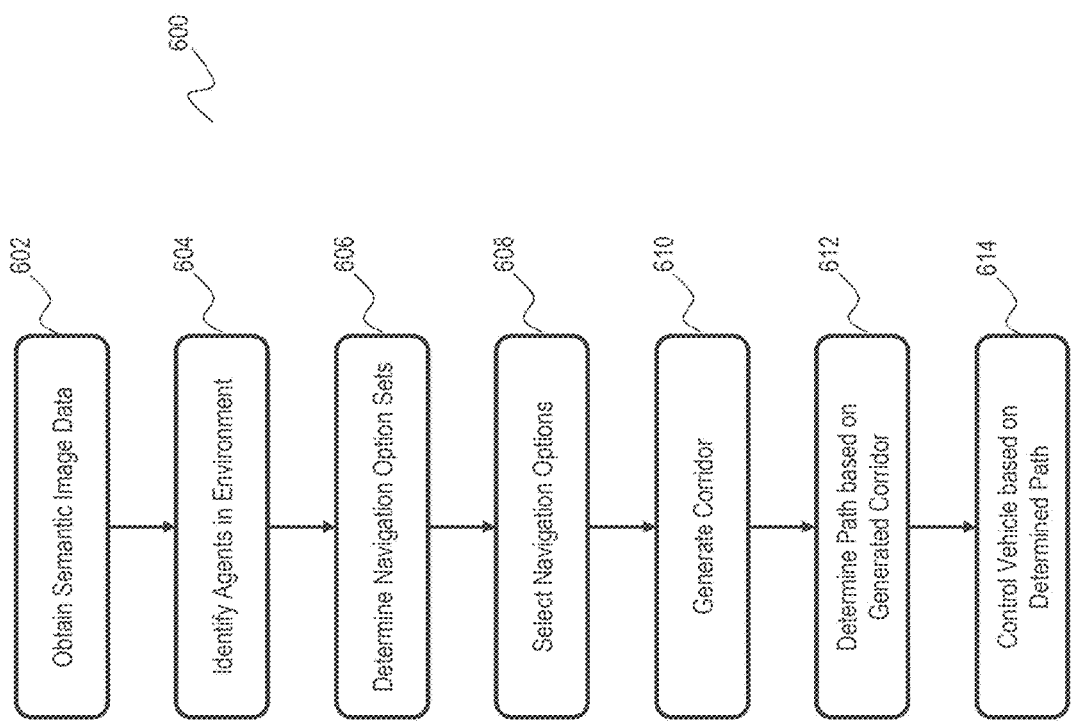
FIG. 6 is a flowchart of a process for homotopy/navigation selection, scoring, and validation.

FIG. 6 is a flowchart of an example process 600 for using corridors to generate paths and control a vehicle. In some examples, one or more of the steps described with respect to process 600 are performed (e.g., completely, partially, and/or the like) by the planning system 404 (e.g., where the planning system 404 is implemented by autonomous system 202). Additionally, or alternatively, in some examples one or more steps described with respect to process 600 are performed (e.g., completely, partially, and/or the like) by another device or group of devices separate from or including the planning system 404 such as the perception system 402 (e.g., where the perception system 402 is implemented by autonomous system 402).

At block 602, the planning system 404 receives semantic image data from the perception system 402. The semantic image data is associated with at least one physical object in an environment. The planning system 404 classifies the at least one physical object. The semantic image data can be associated with an environment in which the autonomous vehicle 200 is operating. For example, the planning system 404 receives semantic image data that is associated with a car, pedestrian, road features, and traffic signal in the environment around the vehicle 200.

At block 604 the planning system 404 identifies agents in the environment based on the semantic image data received from the perception system 402. As described herein, in some examples, the perception system 402 can implement at least one machine learning model as part of a pipeline for classifying one or more objects located in an environment and/or the like. The planning system 404 can identify the various objects from the semantic image data based on the classification of those objects. For example, the planning system 404 can identify one or more cars, pedestrians, road features, or traffic signals as respective objects based on the data received from the perception system 402.

At block 606, the planning system 404 determines/generates navigation option sets based on the identified objects, map elements, and surrounding features in the environment such as roads, a lane of a road, barriers, etc. As described herein, a navigation option set can include a first navigation option and a second navigation option associated with an agent or other identified object. As described herein, the navigation options can form part of one or more potential corridors for the vehicle 200.

In some examples, each navigation option represents a prediction of an interaction between the vehicle 200 and at least one agent or object. For example, the planning system 404 can determine that a potential path around an agent can be to the left of the vehicle's 200 location at a given time and another potential path around the agent is to the right of the vehicle's 200 location at the given time. As another example, the planning system 404 can determine to take a path to the left of a stationary obstacle or to the right of a stationary obstacle. As yet another example, the planning system 404 can determine to take a path that is in front of a moving agent, such as a bicycle, by passing in front of the bicycle. In another example, the navigation option can be to increase the speed of the vehicle 200 to proceed through an intersection before another vehicle reaches the intersection. Alternatively, the navigation option can be to slow down to wait for the other vehicle to enter the intersection and then proceed behind the other vehicle. However, the planning system 404 can evaluate any physically possible option for navigating the vehicle 200 in the environment.

In some examples, one or more of the navigation options can be determined based on other (previous) navigation options. In certain cases, at least one of the navigation options can branch from previous navigation options as described above with respect to FIG. 5. For example, going in front of one object can result in a different set of subsequent navigation options than going behind the object. Similarly, going to the left of an object can result in a different set of subsequent navigation options than going to the right of the object. As such, some navigation options can be identified by the planning system 404 depending on other navigation options. However, it will be understood that in certain cases, a navigation option can be independent of previous navigation options.

At block 608, the planning system 404 selects navigation options. As part of selecting navigation options, the planning system 404 evaluates the navigation option sets. In some cases, the planning system 404 selects at least one navigation option from one or more of the navigation option sets. In certain cases, the planning system 404 selects a navigation option based on corridor validation criteria. For example, if the planning system 404 determines that a navigation option is likely to result in a collision or the vehicle 200 moving to an unsafe location, such as off the road, etc., the planning system 404 can determine that the navigation option does not satisfy the corridor validation criteria. If the planning system 404 determines that the navigation option satisfies the corridor validation criteria, the planning system 404 can select the navigation option.

In some cases, the planning system 404 can select navigation options based at least in part on physical capabilities of the vehicle 200. Additionally, or alternatively, the corridor validation criteria can also be based at least in part on physical capabilities of the vehicle 200. For example, if a navigation option includes a lateral shift rate that is greater than a turning capability of the vehicle 200, the planning system 404 can determine that the navigation option does not satisfy the corridor validation criteria.

In some examples, the corridor validation criteria can be selected based on a predetermined set of priorities. For example, the corridor validation criteria can indicate that the planning system 404 is to prioritize (or, in certain cases, only select navigation options for) remaining on a single road or not changing lanes. As such, the planning system 404 can select navigation options that cause the vehicle 200 to remain on the given road or lane. In some examples, the set of priorities can be priorities such as safety, regulatory priorities, and comfort.

As described herein, in some examples, no navigation option of a navigation option set can meet the corridor validation criteria. In such cases, the planning system 404 eliminates both navigation options for potential use in a corridor and reverts to a previous navigation option set that contains navigation options suitable for selection.

In some cases, upon selecting a navigation option, the planning system 404 can branch or generate at least one additional navigation option set and evaluate the navigation options of the generated navigation option set. In some cases, the planning system 404 can recursively generate a navigation option set, evaluate the navigation options of the navigation option set, and select at least one of the navigation options from which to generate another navigation option set until an end state is reached, as described herein. For example, the planning system 404 can continue generating navigation option sets, evaluating the navigation options of the navigation option set, and selecting at least one of the navigation options until a threshold time period is satisfied, a threshold simulation time period is satisfied, a threshold number of navigation option sets is generated, and/or a threshold number of levels of navigation option sets is generated, etc.

At block 610, the planning system 404 generates corridors based on the selected navigation options. As described herein, multiple navigation options are grouped together to form or generate a corridor. Accordingly, the selected navigation options from the navigation option sets are used to generate one or more corridors. For example, the planning system 404 can select a navigation option from each of a series of successive navigation option sets to generate a corridor.

Moreover, the planning system 404 can generate a plurality of corridors that include the various combinations of the navigation options selected at block 608. For example, the planning system 404 can generate a first corridor for the vehicle 200 based on a first set of navigation options selected from a first set of successive navigation option sets. The planning system 404 can concurrently generate a second corridor for the vehicle 200 based on a second set of navigation options selected from a second set of successive navigation option sets.

In some cases, the first set of navigation options used to generate the first corridor and the second set of navigation options used to generate the second corridor can overlap (e.g., have at least one navigation option that is common between the first and second set of navigation options). In certain cases, the first set of navigation options includes at least one (or only one) navigation option that is different from the navigation options of the second set of navigation options.

Similarly, the navigation option sets of the second set of successive navigation option sets can overlap with the navigation option sets of the first set of successive navigation option sets (e.g., have at least one navigation option set that is common between the first and second set of successive navigation option sets). In certain cases, the first set of successive navigation option sets includes at least one navigation option set that is different from the navigation option set of the second set of successive navigation option sets. In certain cases, the first set of successive navigation option sets is the same as the second set of successive navigation option sets but the first set of navigation options of the first corridor are different from the second set of navigation options of the second corridor (e.g., a different navigation option is selected for at least one of the navigation option sets).

At block 612, the planning system 404 determines a path based on one or more generated corridors. In some cases, the planning system 404 can select a corridor from a set of corridors and determine a path based on the selected corridor. In some such cases, the planning system 404 can score or rank the generated corridors based on a corridor evaluation policy and analyze corridors based on a scoring or ranking of the corridors. For example, the planning system 404 can determine to further evaluate corridors that fall within a predetermined score threshold that indicates a level of compliance with the corridor evaluation policy. In some cases, the corridors can be scored based on safety (e.g., no collision), efficiency (e.g., deviation from route), etc.

In some cases, the planning system 404 can simulate a plurality of paths through each analyzed corridor and determine which path is most advantageous given a set of priorities or according to a path planning policy. For example, the planning system 404 can determine multiple potential paths of the vehicle 200 for a particular corridor (or multiple corridors) and compare the multiple potential paths of the vehicle 200 which are each a subspace of the corridor (or respective corridors). The planning system 404 can then select a desired detailed path based on criteria or evaluation as described above with respect to FIG. 5. In some examples, the planning system 404 can select a desired detailed path based on safety, regulatory, or comfort priorities. For example, the planning system 404 can run safety simulations, rank safety of the detailed paths, and choose the detailed path that has the highest safety ranking.

At block 614, the planning system 404 as implemented by the autonomous system 202 transmits instructions to the drive-by-wire system 202h, which transmits instructions to the powertrain control system 204, steering control system 206, and brake system 208 to cause the vehicle 200 to follow the path. For example, the planning system 404 can transmit instructions to cause the steering control system 206 to cause the vehicle 200 to navigate around an agent according to the determined path. The planning system 404 can further transmit instructions to cause the brake system 208 to stop the vehicle 200 before it collides with the agent.

Figure 7A:
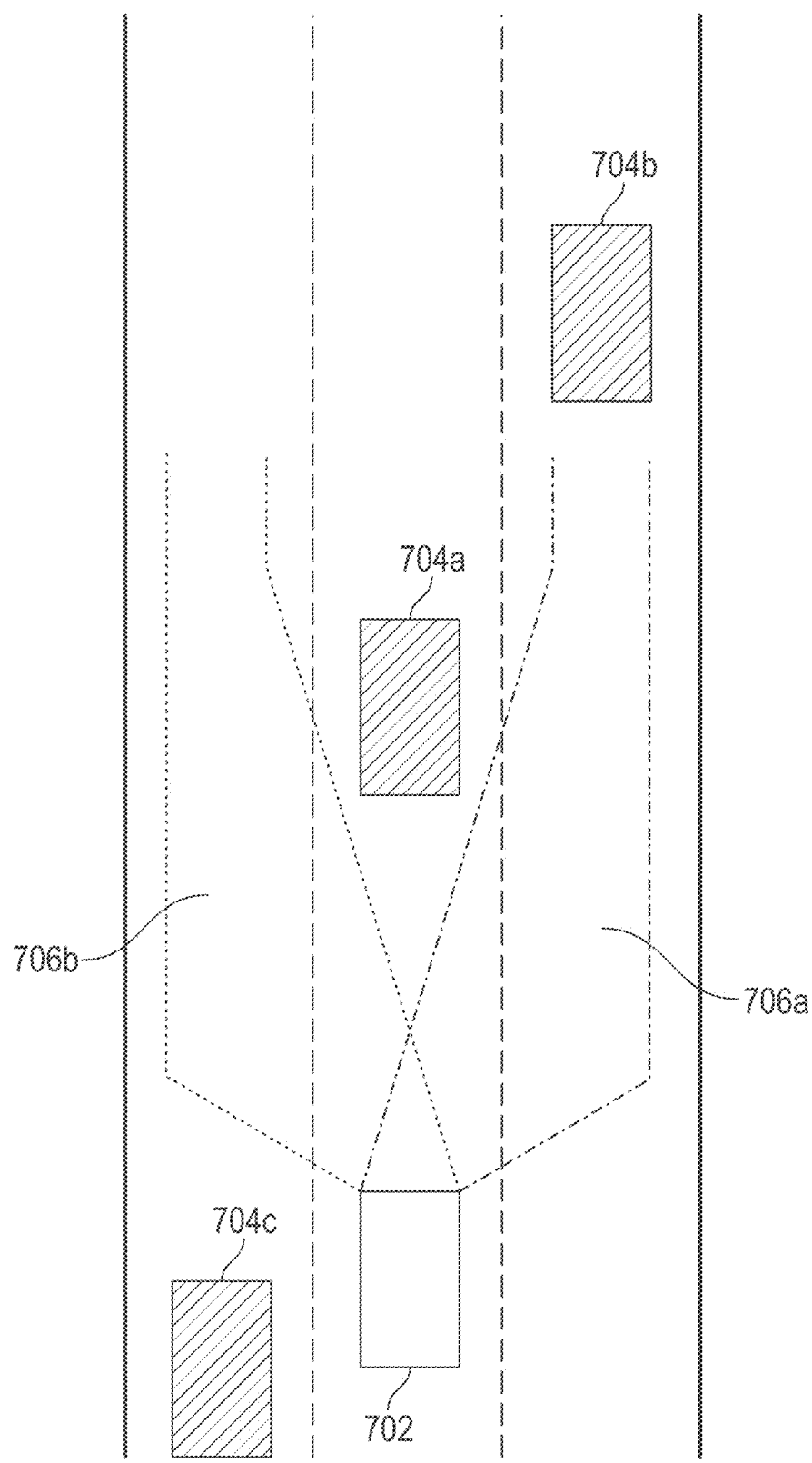
FIG. 7 is a diagram of an implementation of a process for determining a corridor.

FIG. 7A is a diagram illustrating an example of multiple corridors for a vehicle. In the illustrated example, the corridors are generated based on homotopy options of "go-left" or "go-right." As described herein, the planning system 404 receives semantic image data associated with a semantic image of a scene. Thus, FIG. 7A can illustrate an example representation of an environment of a vehicle generated based on semantic image data received by the perception system 402. In the illustrated example, the environment includes ego vehicle 702, which is an autonomous vehicle (similar to the vehicle 200 described herein at least with reference to FIG. 2) vehicles 704a, 704b, 704c (individually or collectively referred to as vehicle(s) 704). FIG. 7A further shows a first corridor 706a, and a second corridor 706b. As described herein, the planning system 404 can generate the corridors 706a, 706b based on one or more navigation options from the same or different navigation option sets.

The first corridor 706a and the second corridor 706b extend from a location of ego vehicle 702 at a certain point in time. The first corridor 706a represents results of choosing a navigation option to "go-right" with respect to the vehicle 704a. The second corridor 706b represents results of a navigation option to "go-left" with respect to the vehicle 704a. As noted, the selection of go-left and go-right present the ego vehicle 702 with different subsequent options. For example, going right puts the ego vehicle 702 behind vehicle 704b, thereby limiting ego vehicle's 702 ability to perform certain actions, such as accelerating or possibly maintaining a current speed. The inability to accelerate or maintain its current speed can also limit ego vehicle's 702 ability to go left and pass vehicle 704a. Moreover, by going right, ego vehicle 702 can be unable to go right again as that can take the ego vehicle 702 off the road. Similarly, going left can limit ego vehicle's 702 ability to go left again. Moreover, going left can place ego vehicle 702 in an unsafe or unpreferred location relative to vehicle 704c (e.g., going left can cut off vehicle 704c).

In the illustrated example, the navigation option sets include homotopy options of go right or go left, however, it will be understood that other homotopy options can be used as well, such as going in front or behind an agent (e.g., going in front of or behind vehicle 704c). Moreover, the ego vehicle 702 can change between different homotopy options depending on the scenario or environment. For example, after generating a corridor and selecting a path based on homotopy options of go left vs. go right, the ego vehicle 702 can switch to a generating a corridor based on homotopy options of going before or after an agent. As a non-limiting example, after moving to the right lane behind vehicle 704b, the ego vehicle 702 can determine corridors based on going before or after vehicle 704a.

In addition, in the illustrated example, going left and going right correspond to the ego vehicle 702 changing lanes, however, it will be understood that going left or going right can correspond to any type of movement to the left or right, such as moving to a left portion of a lane or to a right portion of the lane (without leaving the lane).

The planning system 404 can score each of the corridors 706a, 706b based on predetermined criteria and/or a corridor evaluation policy. In the illustrated example, if the predetermined criteria prioritize safety, the planning system 404 can prioritize the first corridor 706a, as following the first corridor 706a would not cause ego vehicle 702 to cross in front of the vehicle 704c. If the planning system 404 prioritizes velocity or route flexibility, the planning system 404 can prioritize the second corridor 706b due to less traffic projected to be in the second corridor 706b.

Figure 7B:
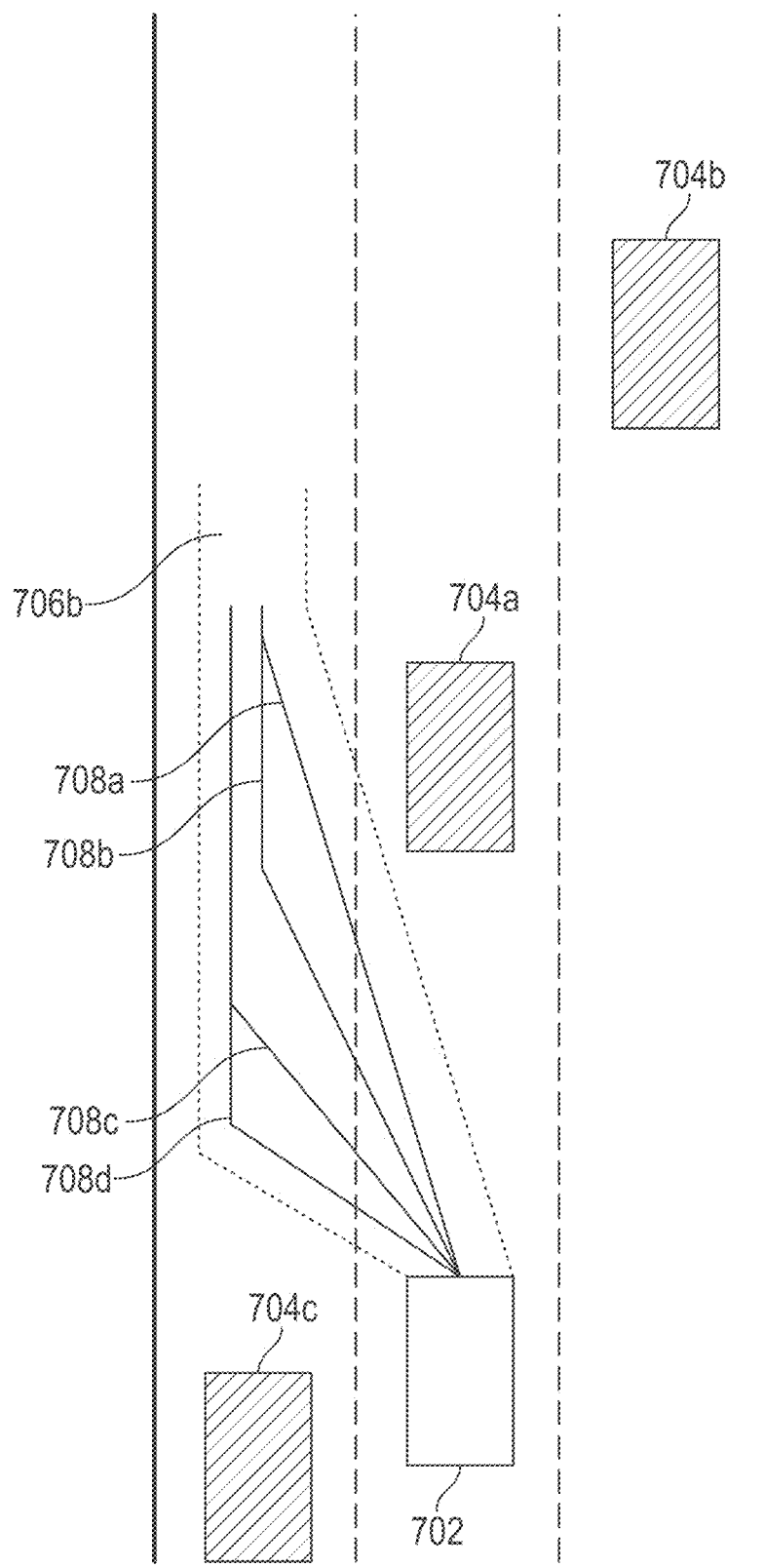

FIG. 7B is a diagram illustrating an example of generating paths within a selected corridor. As described herein, the planning system 404 can evaluate and rank the generated corridors and select one or more corridors for additional evaluation. In some cases, the additional evaluation can include generating and evaluating paths within the corridor. With reference to the illustrated example of FIG. 7B, the planning system 404 has selected the second corridor 706b for further evaluation and has generated various paths 708a, 708b, 708c, 708d within the second corridor 706b.

As illustrated in FIG. 7B, the planning system 404 can simulate and evaluate at least one path through the corridor 706b chosen for further evaluation. In some examples, the planning system 404 can evaluate a plurality of paths through each generated corridor and further rank and evaluate each of the paths through each of the corridors. The planning system 404 can then rank the paths through each of the selected corridors based on factors such as shortest distance, safety, or any other factor that can inform a navigation decision through the selected corridor. Once the preferred path is chosen, the processor can send instructions to the control system 408 to cause the vehicle 200 to follow a chosen detailed path.

In this example, the planning system 404 can score first path 708a and second paths 708b above the third path 708c and fourth path 708d, as the third path 708c and fourth path 708d can be determined to be less safe or more likely to cause a collision at least with the vehicle 704c. The planning system 404 can also prioritize the first path 708a or the third path 708c according to the system priorities as described above. The planning system 404 can then select the 708a or the third path 708c for ego vehicle 702 to take.

Figure 8:
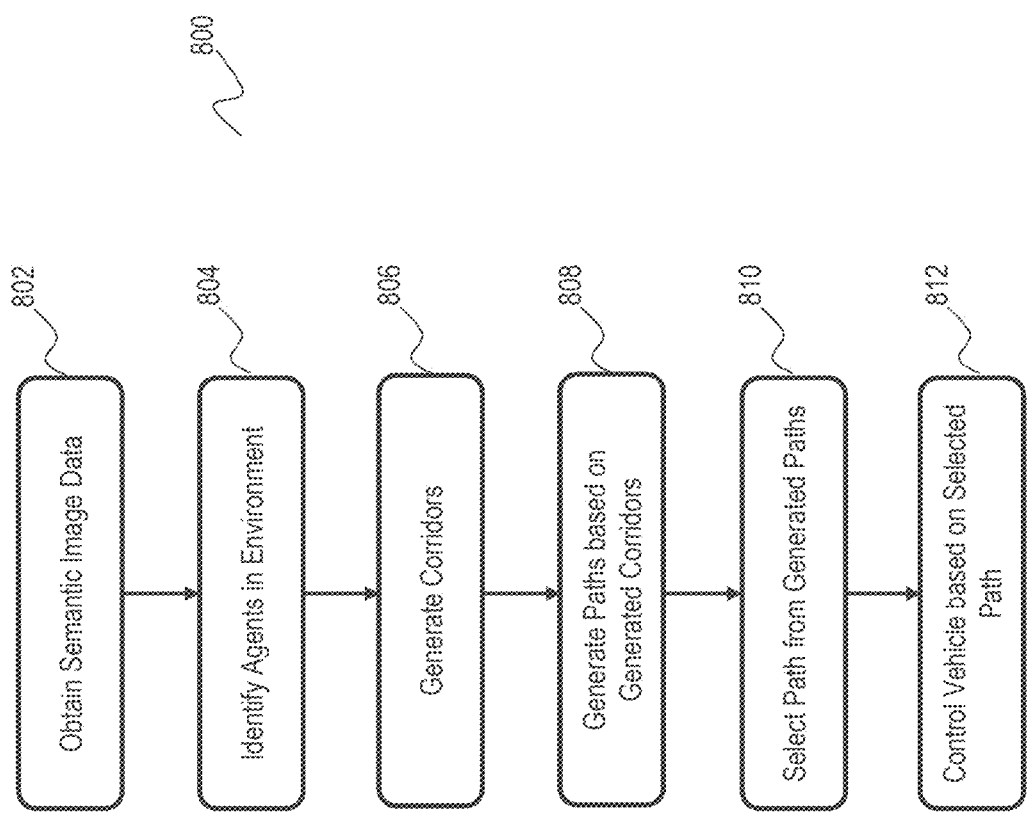
FIG. 8 is a flowchart of a process for corridor selection, scoring, and validation.

FIG. 8 is a is a flowchart of an example process 800 for corridor scoring and validation. In some examples, one or more of the steps described with respect to process 800 are performed (e.g., completely, partially, and/or the like) by the planning system 404 (e.g., where the planning system 404 is implemented by autonomous system 202). Additionally, or alternatively, in some examples one or more steps described with respect to process 800 are performed (e.g., completely, partially, and/or the like) by another device or group of devices separate from or including the planning system 404 such as the perception system 402 (e.g., where the perception system 402 is implemented by autonomous system 402), etc.

At block 802, the planning system 404 receives data from the perception system 402, which obtains sensor data, as described above with respect to FIG. 6.

At block 804 the planning system 404 identifies agents in the environment based on the sensor data received from the perception system 402 as described above with respect to FIG. 6.

At block 806, the planning system 404 generates corridors using navigation options as described above with respect to FIGS. 5 and 6. In some examples, the corridors are generated at least in part through path simulations or other methods of determining paths through environments. For example, the processor can simulate a trajectory of a vehicle from a first point to a second point using techniques such as physics-based trajectory calculation and swept path analysis. In some examples, the corridors are generated at least in part by a remote processor or trained neural network.

At block 808, the planning system 404 generates detailed paths within one or more of the corridors. As described herein, in some cases, the planning system 404 can rank the generated corridors and select one or more of the generated corridors for further evaluation and/or processing. In certain cases, the planning system 404 ranks and/or selects a corridor based on a velocity or progress associated with the corridor, a spatial or temporal window associated with the corridor, or corridor costs based on a determination of computational resources to be used to evaluate a particular corridor.

The planning system 404 can generate a plurality of detailed paths for one or more of the selected corridors. The planning system 404 can determine the detailed paths by calculating particular trajectories of the vehicle, based on the vehicle capabilities and the surrounding environment. For example, the detailed path can be determined based on braking and traction capabilities of the vehicle 200 and swept path analysis. In some examples, the detailed path can be generated to follow road markings or adjust to changing road surfaces such as potholes and unfinished roads.

At block 810, the planning system 404 selects a path from the generated paths based on system priorities and/or a path planning policy. The system processor can select a path from a plurality of paths that have been determined for a selected corridor. The selected path can be a path that provides an optimized trajectory for the vehicle 200. For example, the selected path can be a path that that provides a smoothest road surface or avoids obstacles in the corridor that other detailed paths do not avoid.

At block 812, the planning system 404 as implemented by the autonomous system 202 transmits instructions to the drive-by-wire system 202h, which transmits instructions to at least one of the powertrain control system 204, steering control system 206, and brake system 208 to cause the vehicle 200 to follow the selected path. For example, the planning system 404 can send instructions to cause the powertrain control system 204 to accelerate and cause the vehicle 200 to avoid colliding with an agent. The planning system 404 can send instructions to cause the steering control system 206 to cause the vehicle 200 to navigate around an agent. The planning system 404 can send instructions to cause the brake system 208 to stop the vehicle 200 before it collides with an agent.

The flow diagrams illustrated in FIGS. 6 and 8 are provided for illustrative purposes only. It will be understood that one or more of the steps of the routines illustrated in FIGS. 6 and 8 can be removed or that the ordering of the steps can be changed. In addition, it will be understood that one or more steps from FIG. 6 can be combined with one or more steps from FIG. 8. Furthermore, for the purposes of illustrating a clear example, one or more particular system components are described in the context of performing various operations during each of the data flow stages. However, other system arrangements and distributions of the processing steps across system components can be used.

In some examples, one or more of the steps described with respect to processes 600, and 800 are performed (e.g., completely, partially, and/or the like) by the planning system 404 or other systems of the vehicle 200. Additionally, or alternatively, in some embodiments one or more steps described with respect to processes 600, and 800 are performed (e.g., completely, partially, and/or the like) by another device or group of devices separate from or including the planning system 404 or other systems of the vehicle 200 such as a processor remote from the planning system 404 or other systems of the vehicle 200.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

Various additional example embodiments of the disclosure can be described by the following clauses:

Clause 1. A method for operating an autonomous vehicle, the method comprising:
  obtaining, by at least one processor, sensor data associated with an environment in which an autonomous vehicle is operating;
  determining, by the at least one processor, a set of agents in the environment based on the sensor data;
  determining, by the at least one processor, a plurality of sets of navigation options for the autonomous vehicle, wherein each set of navigation options comprises a first navigation option and a second navigation option, and wherein at least one set of navigation options is associated with at least one agent of the set of agents;
  selecting by the at least one processor a plurality of navigation options from the plurality of sets of navigation options; and
  generating by the at least one processor a corridor for the autonomous vehicle based on the plurality of selected navigation options.

Clause 2. The method of clause 1, wherein selecting by the at least one processor a navigation option from the plurality of navigation options comprises selecting a navigation option from each set of navigation options of the plurality of sets of navigation options.

Clause 3. The method of clause 1, wherein determining by the at least one processor, a plurality of sets of navigation options comprises determining at least one set of navigation options that corresponds to at least one agent of the set of agents.

Clause 4. The method of clause 1, wherein determining a first set of navigation options of the plurality of sets of navigation options is dependent on selecting a particular navigation option from a second set of navigation options of the plurality of sets of navigation options.

Clause 5. The method of clause 1, further comprising scoring the corridor based on predetermined criteria.

Clause 6. The method of clause 5, wherein selecting by the at least one processor a plurality of navigation options from the plurality of sets of navigation options comprises selecting a first plurality of navigation options, and
  wherein generating by the at least one processor a corridor for the autonomous vehicle comprises generating a first corridor;
  the method further comprising:
  determining at least one additional set of navigation options, wherein the at least one additional set of navigation options comprises a first additional navigation option and a second additional navigation option;
  selecting a second plurality of navigation options from the plurality of sets of navigation options and the at least one additional set of navigation options; and
  generating a second corridor for the autonomous vehicle based on the plurality of selected navigation options.

Clause 7. The method of clause 6, further comprising:
  scoring the second corridor based on the predetermined criteria;
  determining a vehicle path using one of the first corridor or the second corridor based on the scoring the first corridor and the scoring the second corridor; and causing the autonomous vehicle to move along the determined vehicle path.

Clause 8. The method of clause 1, further comprising determining, by the at least one processor, at least one map element, wherein at least one of the plurality of navigation options is associated with at least one map element.

Clause 9. The method of clause 8, wherein determining, by the at least one processor, at least one map element comprises determining, by the at least one processor, a lane of a road.

Clause 10. The method of clause 1, wherein selecting a plurality of navigation options from the plurality of sets of navigation options, further comprises selecting a plurality of navigation options associated with predetermined priorities.

Clause 11. The method of clause 10, wherein selecting a plurality of navigation options associated with predetermined priorities comprises selecting a plurality of navigation options associated with at least one of safety priorities, regulatory priorities, and comfort priorities.

Clause 12. The method of clause 1, wherein selecting by the at least one processor a plurality of navigation options from the plurality of sets of navigation options comprises selecting a plurality of navigation options associated with a prediction of an interaction between the autonomous vehicle and at least one agent of the set of agents.

Clause 13. The method of clause 1, wherein selecting a plurality of navigation options comprises comparing a lateral shift rate of the corridor to a turning capability of the autonomous vehicle.

Clause 14. The method of clause 1, further comprising transmitting selected navigation options to a control system which transmits the selected navigation options to a drive-by-wire system.

Clause 15. The method of clause 1, further comprising determining at least one vehicle trajectory, wherein, the vehicle trajectory is a subspace of the corridor.

Clause 16. The method of clause 15, wherein determining the at least one vehicle trajectory comprises determining a plurality of vehicle trajectories, and wherein the method further comprises comparing and scoring the plurality of vehicle trajectories and controlling the autonomous vehicle based on the vehicle trajectories.

Clause 17. The method of clause 16, further comprising selecting the vehicle trajectory from the plurality of vehicle trajectories based on predetermined priorities.

Clause 18. The method of clause 17, wherein selecting the vehicle trajectory based on predetermined priorities comprises selecting a vehicle trajectory associated with at least one of safety priorities, regulatory priorities, and comfort priorities.

Clause 19. The method of clause 1, further comprising, forgoing selection of a navigation option in a set of navigation options.

Clause 20. The method of clause 19, further comprising selecting an alternative navigation option from a corridor that is not associated with the set of navigation options from which neither navigation option was selected.

1. Clause 1. A method for operating an autonomous vehicle, the method comprising:
    obtaining, by at least one processor, sensor data associated with an environment in which an autonomous vehicle is operating;
    determining, by the at least one processor, a set of agents in the environment based on the sensor data;
    generating, by the at least one processor, a plurality of corridors, wherein each corridor is generated based at least in part on a plurality of binary decisions relative to a set of agents;
    generating, by the at least one processor, at least one path for at least one generated corridor;
    selecting, by the at least one processor, a path of the at least one path; and controlling, by the at least one processor, the autonomous vehicle based on the at least one path.

Clause 2. The method of clause 1, wherein generating, by the at least one processor, a plurality of corridors further comprises generating each corridor based in part on a plurality of non-binary decisions.

Clause 3. The method of clause 1, further comprising scoring the plurality of corridors based on a predetermined set of priorities.

Clause 4. The method of clause 3, wherein scoring the plurality of corridors based on a predetermined set of priorities further comprises scoring the plurality of corridors based on at least one of safety priorities, regulatory priorities, and comfort priorities.

Clause 5. The method of clause 1, wherein generating one or more paths further comprises determining at least one vehicle trajectory, wherein, the vehicle trajectory is associated with a subspace of one of the corridors.

Clause 6. The method of clause 1, wherein determining at least one vehicle trajectory comprises determining a plurality of vehicle trajectories, and wherein the method further comprises comparing and scoring the plurality of vehicle trajectories.

Clause 7. The method of clause 1, further comprising selecting the at least one vehicle trajectory from the plurality of vehicle trajectories based on predetermined priorities.

Clause 8. The method of clause 7, wherein selecting the at least one vehicle trajectory from the plurality of vehicle trajectories based on predetermined priorities comprises selecting the at least one vehicle trajectory based on at least one of safety priorities, regulatory priorities, and comfort priorities.

Clause 9. The method of clause 1, wherein generating, by the at least one processor, a plurality of corridors based at least in part on a plurality of binary decisions relative to a set of agents comprises generating each corridor based at least in part on a decision to go before an agent or after an agent.

Clause 10. The method of clause 1, wherein generating, by the at least one processor, a plurality of corridors based at least in part on a plurality of binary decisions relative to a set of agents comprises generating each corridor based at least in part on a decision to pass on a first side or on a second side of an agent of the set of agents.

Clause 11. A system for operating an autonomous vehicle, the system comprising:
at least one processor, and
at least one non-transitory storage media storing instructions that, when executed by the at least one processor, cause the at least one processor to:
obtain, by at least one processor, sensor data associated with an environment in which an autonomous vehicle is operating;
determine, by the at least one processor, a set of agents in the environment based on the sensor data;
generate a plurality of corridors wherein each corridor is generated based at least in part on a plurality of binary decisions relative to a set of agents;
generate at least one path for each generated corridor; and
selecting a path of the at least one path.

Clause 12. The system of clause 11, wherein each corridor is generated based in part on a plurality of non-binary decisions.

Clause 13. The system of clause 11, further comprising scoring the corridor based on a predetermined set of priorities.

Clause 14. The system of clause 11, wherein at least one binary decision is a decision to go before an agent or after an agent.

Clause 15. The system of clause 11, wherein at least one binary decision is a decision to pass on a first side or on a second side of an agent of the set of agents.

Clause 16. At least one non-transitory storage media storing instructions that, when executed by at least one processor, cause the at least one processor to:
obtain, by at least one processor, sensor data associated with an environment in which an autonomous vehicle is operating;
determine, by the at least one processor, a set of agents in the environment based on the sensor data;
generate a plurality of corridors wherein each corridor is generated based at least in part on a plurality of binary decisions relative to a set of agents;
generate at least one path for each generated corridor; and
selecting a path of the at least one path.

Clause 17. The at least one non-transitory storage media of clause 16, wherein each corridor is generated based in part on a plurality of non-binary decisions.

Clause 18. The at least one non-transitory storage media of clause 16, further comprising scoring the corridor based on a predetermined set of priorities.

Clause 19. The at least one non-transitory storage media of clause 16, wherein at least one binary decision is a decision to go before an agent or after an agent.

Clause 20. The at least one non-transitory storage media of clause 16, wherein at least one binary decision is a decision to pass on a first side or on a second side of an agent of the set of agents.

What is claimed is:

1. A method for operating an autonomous vehicle, the method comprising:
obtaining, by at least one processor, sensor data associated with an environment in which an autonomous vehicle is operating;
determining, by the at least one processor, a set of agents in the environment based on the sensor data;
determining, by the at least one processor, a plurality of corridors available to the autonomous vehicle based on different homotopy options for the autonomous vehicle, wherein each of the corridors comprises a plurality of sets of navigation options for the autonomous vehicle corresponding to different paths within the corridor, wherein each path within the corridor is associated with a different trajectory and wherein at least one corridor is associated with at least one agent of the set of agents;
selecting, by the at least one processor, a corridor from the plurality of corridors based at least in part on a first set or priorities;
selecting, by the at least one processor, a set of navigation options from the plurality of sets of navigation options based on a second set of priorities, wherein the set of navigation options corresponds to a path within the selected corridor and
controlling the autonomous vehicle based on the selected set of navigation options corresponding to the path.

2. The method of claim 1, wherein selecting by the at least one processor the set of navigation options comprises selecting a navigation option from each set of navigation options of the plurality of sets of navigation options.

3. The method of claim 1, wherein determining by the at least one processor, the plurality of corridors comprises determining at least one corridor that corresponds to at least one agent of the set of agents.

4. The method of any of claim 1, wherein determining a first set of navigation options of the plurality of sets of navigation options is dependent on selecting a particular navigation option from a second set of navigation options of the plurality of sets of navigation options.

5. The method of any of claim 1, further comprising scoring the corridor based on predetermined criteria corresponding to the first set of priorities.

6. The method of claim 5, wherein selecting by the at least one processor the corridor from the plurality of corridors comprises selecting a first plurality of navigation options, and wherein the method further comprises:
- determining at least one additional set of navigation options, wherein the at least one additional set of navigation options comprises a first additional navigation option and a second additional navigation option;
- selecting a second set of navigation options from the plurality of sets of navigation options and the at least one additional set of navigation options; and
- generating a second corridor for the autonomous vehicle based on the second set of navigation options.

7. The method of claim 6, further comprising:
- scoring the second corridor based on the predetermined criteria;
- determining the path using one of the corridor or the second corridor based on the scoring of the corridor and the scoring of the second corridor; and
- causing the autonomous vehicle to move along the determined path.

8. The method of any of claim 1, further comprising determining, by the at least one processor, at least one map element, wherein at least one navigation option is associated with at least one map element.

9. The method of claim 8, wherein determining, by the at least one processor, at least one map element comprises determining, by the at least one processor, a lane of a road.

10. The method of claim 1, wherein the first set of priorities comprises at least one of safety priorities, regulatory priorities, or comfort priorities.

11. The method of any of any of claim 1, wherein selecting the corridor from the plurality of corridors comprises selecting the corridor associated with a prediction of an interaction between the autonomous vehicle and at least one agent of the set of agents.

12. The method of any of any of claim 1, wherein selecting the set of navigation options comprises comparing a lateral shift rate of the corridor to a turning capability of the autonomous vehicle.

13. The method of any of any of claim 1, further comprising transmitting the selected navigation options to a control system which transmits the selected navigation options to a drive-by-wire system.

14. The method of any of any of claim 1, further comprising determining at least one vehicle trajectory, wherein, the vehicle trajectory is a subspace of the corridor.

15. The method of claim 14, wherein determining the at least one vehicle trajectory comprises determining a plurality of vehicle trajectories, and wherein the method further comprises comparing and scoring the plurality of vehicle trajectories and controlling the autonomous vehicle based on the vehicle trajectories.

16. The method of claim 15, further comprising selecting the vehicle trajectory from the plurality of vehicle trajectories based on predetermined priorities.

17. The method of claim 16, wherein selecting the vehicle trajectory based on predetermined priorities comprises selecting a vehicle trajectory associated with at least one of safety priorities, regulatory priorities, and comfort priorities.

18. The method of any of any of claim 1, further comprising, forgoing selection of a navigation option in a set of navigation options.

19. The method of claim 18, further comprising selecting an alternative navigation option from the set of navigation options of the plurality of sets of navigation options of the corridor that is not associated with the set of navigation options which includes the navigation option.

* * * * *